(12) United States Patent
Wortberg et al.

(10) Patent No.: US 9,859,702 B2
(45) Date of Patent: Jan. 2, 2018

(54) INTERRUPTION OF A CURRENT (71) Applicant: Lisa Draexlmaier GmbH, Vilsbiburg (DE)

(72) Inventors: Michael Wortberg, Dorfen (DE); Alfred Kerber, Moosthenning (DE); Jan Marquardt, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 380 days.

(21) Appl. No.: 14/687,156

(22) Filed: Apr. 15, 2015

(65) Prior Publication Data

US 2015/0295395 A1 Oct. 15, 2015

(30) Foreign Application Priority Data

Apr. 15, 2014 (DE) .......................... 10 2014 005 524

(51) Int. Cl.
*H02H 3/00* (2006.01)
*H02H 3/093* (2006.01)

(52) U.S. Cl.
CPC .................................. *H02H 3/093* (2013.01)

(58) Field of Classification Search
CPC .................................................... H02H 3/093
USPC ............................................................ 361/86
See application file for complete search history.

(56) References Cited

U.S. PATENT DOCUMENTS

| 4,266,259 | A | * | 5/1981 | Howell | H02H 3/093 |
| | | | | | 361/94 |
| 5,671,112 | A | * | 9/1997 | Hu | G01R 19/04 |
| | | | | | 322/11 |
| 5,682,101 | A | | 10/1997 | Brooks et al. | |
| 5,751,532 | A | * | 5/1998 | Kanuchok | H02H 3/0935 |
| | | | | | 361/115 |
| 7,009,406 | B2 | | 3/2006 | Naidu et al. | |
| 2003/0063420 | A1 | | 4/2003 | Pahl et al. | |

FOREIGN PATENT DOCUMENTS

| DE | 195 37 495 A1 | 3/1997 |
| DE | 100 41 879 A1 | 3/2002 |
| EP | 2 466 710 A1 | 6/2012 |
| WO | WO 2011/017721 A1 | 2/2011 |

* cited by examiner

*Primary Examiner* — Stephen W Jackson
(74) *Attorney, Agent, or Firm* — Finnegan, Henderson, Farabow, Garrett & Dunner LLP (57) ABSTRACT

A method for interrupting a current of an electrical power supply line includes integrating a supply line signal of the electrical power supply line over a predetermined time period to obtain an integrated signal, determining whether the integrated signal meets a predetermined condition, and using a current interrupting element to interrupt the current if the integrated signal meets the predetermined condition.

11 Claims, 7 Drawing Sheets

INTERRUPTION OF A CURRENT

CROSS-REFERENCE TO RELATED APPLICATION

This application is based upon and claims the benefit of prior German Application No. 10 2014 005 524.8, filed on Apr. 15, 2014, the entire contents of which are incorporated herein by reference.

TECHNICAL FIELD

The disclosure relates to a method for interrupting a current and, more particularly, a method, safety device, and associated device for interruption a current in an electrical arc.

BACKGROUND OF THE DISCLOSURE

In an electrical system of a vehicle with an operating voltage of 48V, for example, parallel electrical arcs may be created, which on the one hand limit the current in such a fashion that a melting fuse is not triggered, but on the other hand may cause a fire in the vehicle.

Furthermore, a cable break in the 48V electrical system may result in a serial electrical arc that cannot be protected by a melting fuse because the resulting current is less than the load current. This type of serial electrical arc can also cause a fire.

SUMMARY

One object of the present disclosure is to provide a solution for recognizing undesired states of an electrical system, in particular an electrical system of a vehicle.

This object is achieved according to the characteristics of the appended claims.

In accordance with the disclosure, there is provided a method for interrupting a current, wherein a signal of a supply line is integrated at least over a predetermined time period, and the current in the supply line is interrupted by means of a separating element if the signal that is integrated over at least the predetermined time period meets a predetermined condition.

In particular, a plurality of time periods, which may be different, can be integrated and evaluated in the scope of the predetermined condition.

The supply line signal can be a signal in the supply line or a signal that is determinable by means of the supply line. For example, it can be a current through a component that is connected to the supply line. It can also be a voltage drop at the component that is connected to the supply line.

In this context, it is an advantage that a precise signal determination (such as current determination) is possible per at least one time period, with the time period being designed flexibly. In particular, the at least one time period may be short compared to a time period in which a conventional (such as melting, for example) fuse would trigger. Another advantage is that a plurality of time periods can be determined and coupled with each other, for example to take into account a load characteristic of an electrical fault, such as an electrical arc, as precisely as possible. As a result, a conventional fuse with a predetermined triggering curve can therefore be upgraded with an active triggering curve that in particular takes into account time periods during which the energy detected in the fuse would not have been sufficient to trigger the fuse.

It is a development of the present disclosure that the current in the supply line is not interrupted, if the signal integrated over the at least one predetermined time period does not meet the predetermined condition, or if the signal integrated over the at least one predetermined time period meets another predetermined condition.

It is a further development of the present disclosure that the signal integrated over the at least one predetermined time period meets a predetermined condition if it reaches and/or exceeds a predetermined threshold value.

In particular, a plurality of threshold values may be provided, such as, for example, one each threshold value for each signal that is integrated over a predetermined time period.

In particular, it is a development of the present disclosure that the signal integrated over a predetermined time period is determined by averaging.

It is also a development of the present disclosure that the averaging is a squared averaging.

Furthermore, it is a development of the present disclosure that the signal is or comprises a current or a voltage.

In the scope of an additional development, the signal is a current through a fuse or a voltage drop at the fuse.

A further development is that the signal is a voltage drop at a fuse, with a resistance value of the fuse being determined at a temperature, and the resistance value and the voltage determining the current through the fuse.

In one embodiment, the signal is integrated by means of at least two integrators, with each of the integrators having its own integration time constant (meaning its own time period).

An alternate embodiment is that the predetermined condition is realized by means of a logical interconnection based on the results of the at least two integrators.

There are a plurality of potential logical interconnections. For example, the integrated signals may meet the predetermined condition if each signal is greater or equal to a threshold value (or a plurality of threshold values). For example, a logical AND-operation can be used for this purpose.

In some embodiments, the threshold value can take into account or depict a load characteristic of an electrical fault, such as a serial and/or a parallel electrical arc. In this way, the triggering curve of the fuse, which may be relatively slow, can be effectively and efficiently upgraded with a quick acting triggering curve. This results in a safety system that comprises the fuse as well as a detection unit with a separating element to detect electrical arcs, for example, and if an electrical arc is detected, the current relative to a load can be switched off.

In addition, it should be noted that the interruption of the current in the supply line can be temporary or permanent. In particular, an additional signalization can be performed, which indicates to a control device, for example, that an electrical arc has been detected. Optionally, the separating element could remain open until the fault can be corrected and/or a control device resets the circuit introduced here.

The explanations regarding the method also apply correspondingly to the other claim categories.

Also in accordance with the present disclosure, there is provided a device having a separating element, and a detection unit that is used to integrate a signal of a supply line over at least a predetermined time period. The detection unit is set up in such a fashion that a current in the supply line can be interrupted by means of the separating element if the signal integrated over at least a predetermined time period meets a predetermined condition.

It is a development of the present disclosure that the device comprises a fuse, with the signal being a current through the fuse, or a voltage drop at the fuse.

For example, the fuse may be a melting fuse in the current path of the supply line.

In some embodiments, the detection unit includes a differential amplifier, which is used to detect a voltage drop at the fuse, and an evaluation unit that compares the predetermined condition with the voltage drop at the fuse, and correspondingly triggers the separating element.

It is an additional development that the separating element is an electronic or a remotely activated switch.

Furthermore, a safety device comprising at least one of the devices described here is provided to attain the object of the present disclosure.

Said safety device can also be considered a safety system.

In the scope of a development of the present disclosure, the safety device can be used in an operating system, in particular a vehicle electrical system such as a 48V electrical system of a vehicle.

The solution presented here furthermore comprises a computer program product that can be loaded directly into a memory of a digital computer and comprises parts of program code that are suitable to perform the steps of the method described here.

In particular, the aforementioned detection unit and/or evaluation unit can be developed as a processor unit and/or a circuit arrangement that is at least partially firmly wired or logical, and is set up, for example, to execute the aforementioned process. Said detection unit and/or evaluation unit may be or comprise any type of processor or computer with the appropriate necessary peripheral devices (memory, input/output interfaces, input-output devices, etc.).

The above explanations relating to the method apply correspondingly to the device. The device may be executed in one component or distributed to a plurality of components.

The aforementioned properties, characteristics and advantages of this invention as well as the way in which they are achieved become clearer and more comprehensible in connection with the following schematic description of embodiments, which are explained in more detail in connection with the drawings. For the sake of clarity, the same or equally acting elements may have the same reference symbols.

DETAILED DESCRIPTION

The solution described here can be used for electrical systems, for example for electrical systems for vehicles, in particular for 48V electrical systems.

Figure 1:
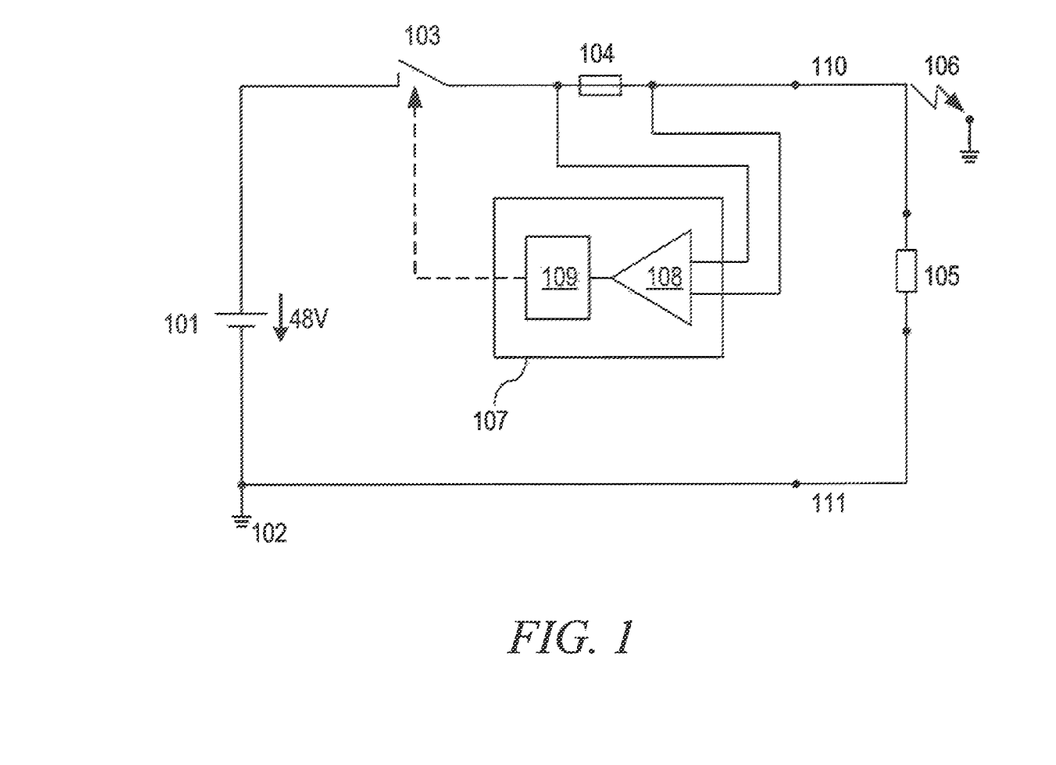
FIG. 1 is a schematic diagram for the detection of a parallel electrical arc and for performing an appropriate action after the electrical arc is detected.

FIG. 1 shows a schematic diagram comprising a battery 101, which in this example provides a voltage of about 48V relative to ground 102. The positive pole of the battery 101 is coupled to the positive pole of a load 105 via a separating element 103, a fuse 104, and a supply line 110. The negative pole of the battery 101 is coupled to the negative pole of the load 105 via a ground line 111.

The load 105 may be any consumer circuit or any switching circuit, such as an operating device in a vehicle, for example.

A voltage drop at the fuse 104 is determined by a detection unit 107 in that one each terminal of the fuse 104 is connected to an input of a differential amplifier 108. The output of the differential amplifier 108 is connected to an evaluation unit 109, which, according to the output signal of the differential amplifier 108, triggers the separating element 103, e.g., opens or closes the separating element 103.

The evaluation unit 109 and the differential amplifier 108 are examples of components of the detection unit 107.

The detection unit 107 is therefore used to determine a voltage drop at the fuse 104, and with said voltage drop an estimation is made as to a current through the fuse 104, in particular a change of the current (dI/dt).

The evaluation unit 109 can be developed as a (micro) controller, a processor, or the like. Also, the evaluation unit 109 can be realized in form of an at least partially analog circuit (comprising an analog filter, for example).

The separating element 103 is a switch that can be electronically triggered, for example. For this purpose, a semiconductor switch, such as a transistor, MOSFET, JFET, IGBT, etc., and/or any other remotely activated switch (such as a relay) can be used.

FIG. 1 also shows the case of a fault in form of a parallel electrical arc 106 that forms between the supply line 110 and ground 102 (as a parallel short circuit). This type of intermittent electrical arc 106 limits the current through the fuse 104 in such a fashion that the energetic average is not sufficient for triggering the fuse 104. Therefore, the electrical arc 106 remains unrecognized and may represent cause for a fire.

To prevent this, the voltage drop at the fuse 104 is supplied to the evaluation unit 109, for example to an analog input of a microcontroller, via the differential amplifier 108. In this way, the voltage drop at the fuse 104 can be measured and recorded continuously or at specific predetermined times, for example, by the evaluation unit 109. For example, to that end, the evaluation unit 109 comprises an analogue-digital-converter that converts the signal provided by the differential amplifier 108 into digital values (samples) and then processes said digital values. In particular, a timeline of the digital values obtained in this manner, for example over a predetermined time period, can be taken into account to draw conclusions about a change in the voltage drop at the fuse 104.

The temperature of the fuse 104 can be determined with a model of the fuse 104 or with a temperature sensor. The temperature is coupled to a resistance value of the fuse 104, which, for example, can be determined by the evaluation unit 109 by means of stored data (for example in the form of a look-up table). With the (temperature-dependent) resistance value obtained in this manner, the current through the fuse can be determined using the known voltage drop at the fuse according to Ohm's Law (voltage drop divided by the resistance value).

The determined current can be averaged for at least one predetermined time period, for example. For example, time windows with durations of 0.1 ms, 1 ms, 10 ms can be used. In particular, averaging can be done by forming the squared average (also called RMS or QMW). In squared averaging, larger values have a greater influence than smaller values.

If multiple time periods are taken into account, the results of the averages determined for each time period can be coupled and the interconnection provides a signal that can be used to open the separating element 103. The interconnection may be an AND-operation, for example. A comparison to a predetermined threshold value can also be made and used to determine an active triggering curve, e.g., a measurement for the opening of the separating element 103.

Figure 2:
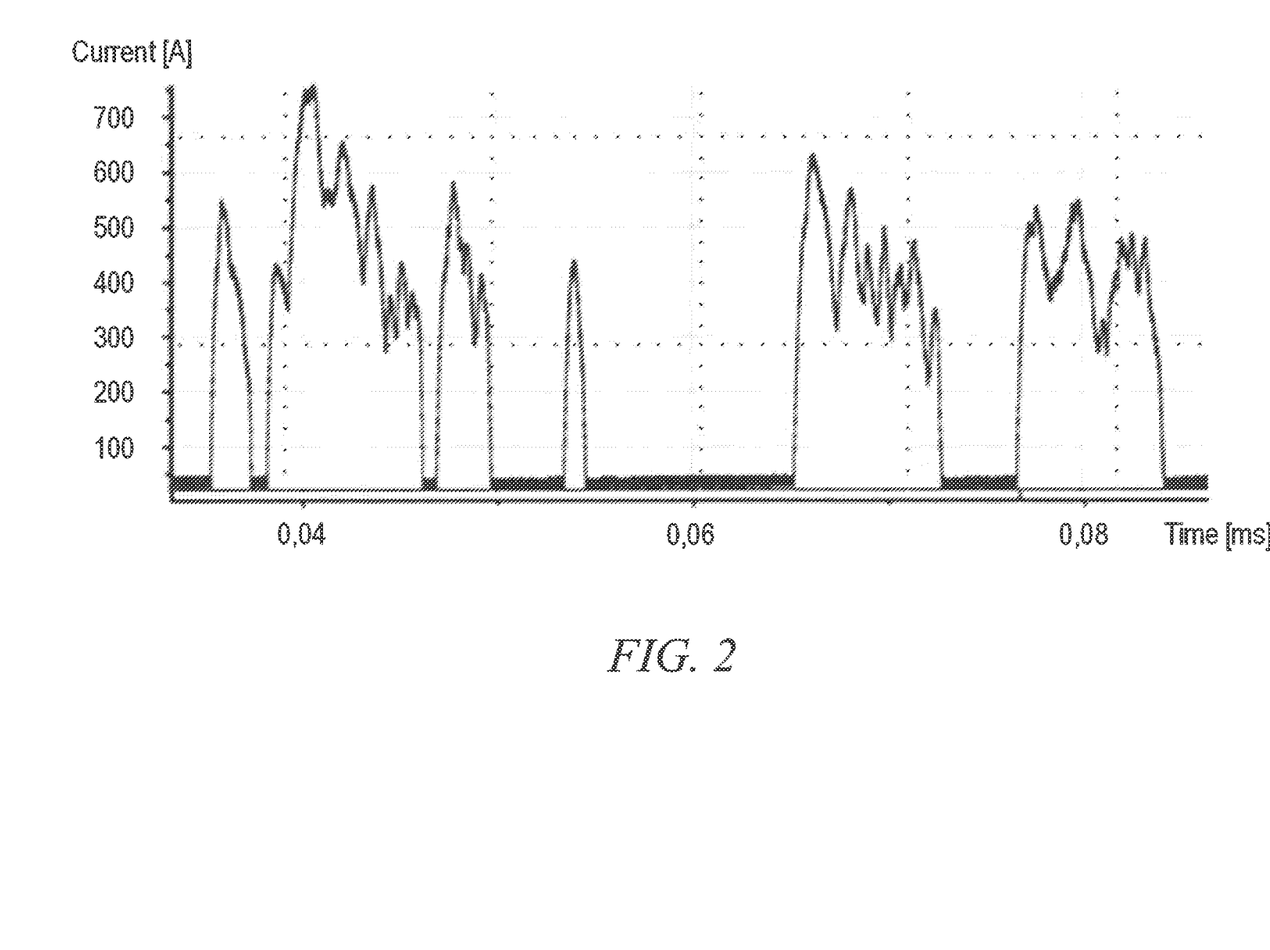
FIG. 2 shows an example of a timeline of a current in the case of the parallel electrical arc.

FIG. 2 shows the example of a timeline of a current in the case of the parallel electrical arc. The parallel electrical arc causes irregular current peaks with high currents, some over 700 A. In the present case, said current peaks are too short for the energy they transmit to trigger the fuse 104.

Figure 3:
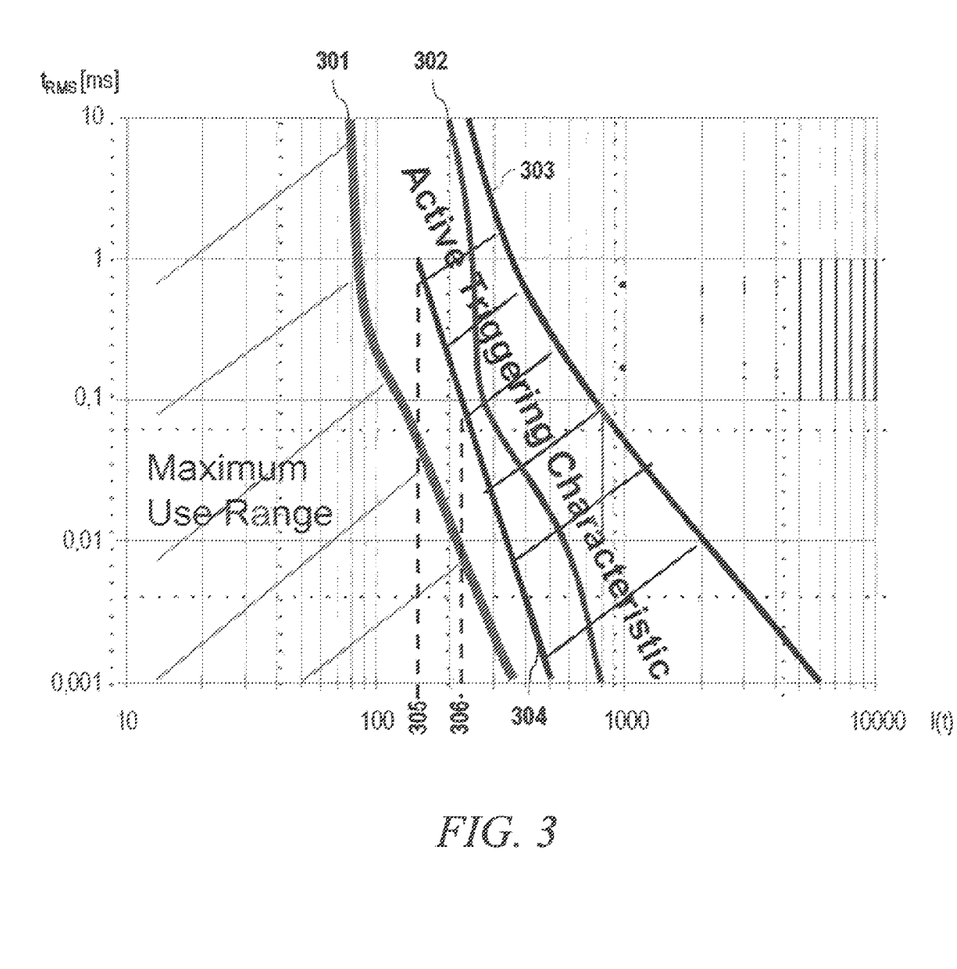
FIG. 3 is a diagram having a y-axis that shows a duration for a time period $t_{RMS}$, during which a squared average (RMS) is formed, and the y-axis of said squared average having a current I(t) as a function of said time.

FIG. 3 shows a diagram where the y-axis shows a duration for a time period $t_{RMS}$, during which a squared average (RMS) is formed, and where the x-axis shows a current I(t) as a function of said time.

A curve 303 represents a triggering curve of the fuse 104. For example, the fuse 104 can trigger when a current of 100 A is permanently applied. However, if the current is applied for only a few milliseconds or a few tens of milliseconds, the fuse 104 will not trigger.

A curve 302 shows a load characteristic of the parallel electrical arc 106, for example corresponding to the timeline shown in FIG. 2. Because the time-dependent current I(t) of the electrical arc 106 does not reach the triggering curve of the fuse 104 (e.g. the curve 302 is positioned left of the curve 303), the electrical arc 106 does not lead to an activation and an interruption of the circuit by the fuse 104.

By means of the detection unit 107, the solution shown here facilitates that the triggering characteristic of the fuse 104 (curve 303) is upgraded with an active triggering characteristic according to a curve 304, which in particular takes into account such time periods as are typical for an electrical arc, but are too short to trigger the fuse 104. By means of the active triggering characteristic, the separating element 103 can already be opened and therefore the electrical arc 106 can be interrupted when the curve 304 is reached and/or exceeded (from left to right in FIG. 3). Because the curve 304 is near the curve 302, i.e., near the load characteristic of the electrical arc 106, the number of faulty triggers can be reduced and/or in particular minimized.

For example, the curve 304 can be realized in such a fashion that, for example, an associated current value 305 is predetermined for the time period $t_{RMS}$=1 ms. Said current value 305 can be used for a first comparison of the output signal of the differential amplifier 108. Optionally, a second comparison can be performed by specifying a second current value 306 based on the time period $t_{RMS}$=0.1 ms. The first and the second comparison can be coupled in various ways to determine whether the separating element 103 should be opened. An example of the implemented interconnection is shown, for example, in FIG. 6 below.

Upgrading the triggering characteristic of the fuse 104 with the active triggering characteristic results in a maximum utilization range, as is shown by example left of a curve 301.

Figure 4:
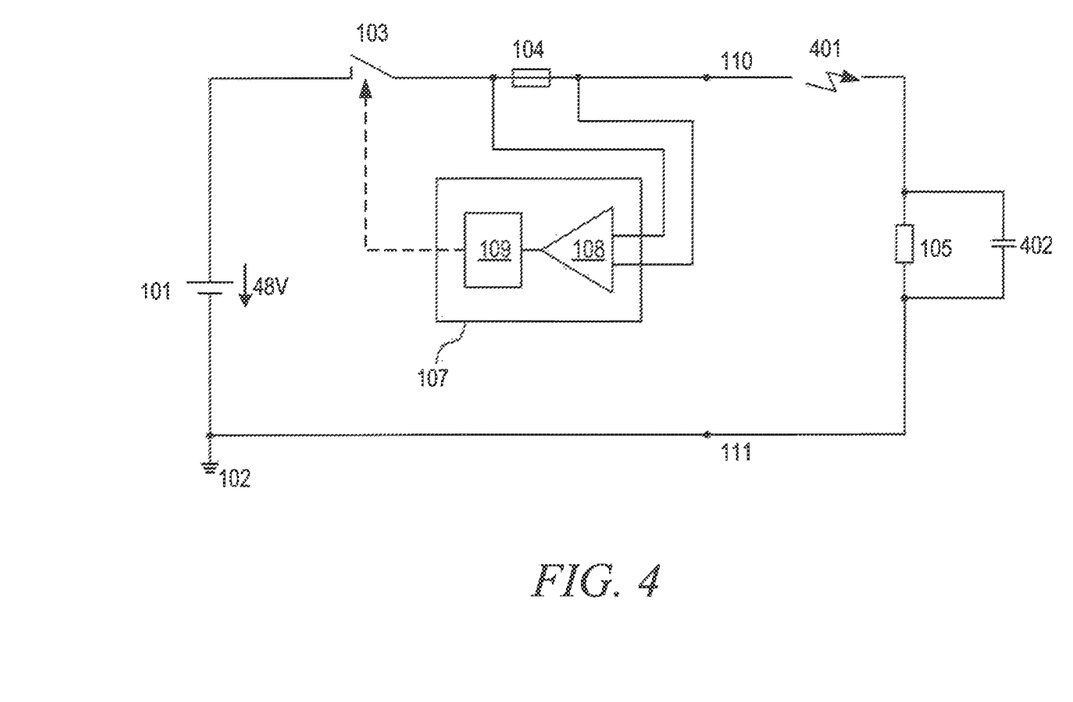
FIG. 4 shows a schematic diagram based on FIG. 1 in the case of a serial electrical arc.

FIG. 4 shows a schematic diagram similar to FIG. 1. In this respect, reference is made to the explanations above. FIG. 4 differs to FIG. 1 in that it shows a serial electrical arc 401 in the supply line 110. In addition, a capacity 402 is arranged parallel to the load 105. Said capacity 402 can also be developed as part of the load 105 (for example, if the load 105 comprises a circuit with a capacitor that is arranged in parallel to said circuit). Preferably, the capacity 402 comprises at least one capacitor, with a capacitor value in the one-digit millifarad range and with a resistance of, for example, less than 20 mOhm being provided parallel to the load 105. In particular, it is possible to customize the dimension of the capacity 402 for the specific user.

To ensure protection against this type of serial electrical arc 401 and the fire risk related thereto, the current through the fuse 104 is detected with the voltage drop at the fuse 104, as described above in the case of the parallel electrical arc 106.

The serial, intermittent electrical arc 401 briefly interrupts the connection to the load 105, and the connection resumes after the interruption. Because the load 105 is supplied from the capacity 402 from the moment the load 105 is interrupted, the capacity 402 is discharged at least partially (or completely). As soon as the electrical arc resumes a conductive connection, large current peaks result to load the capacity 402. Such current peaks can be used to detect the serial electrical arc 401, as in the case of the parallel electrical arc 106.

Figure 5:
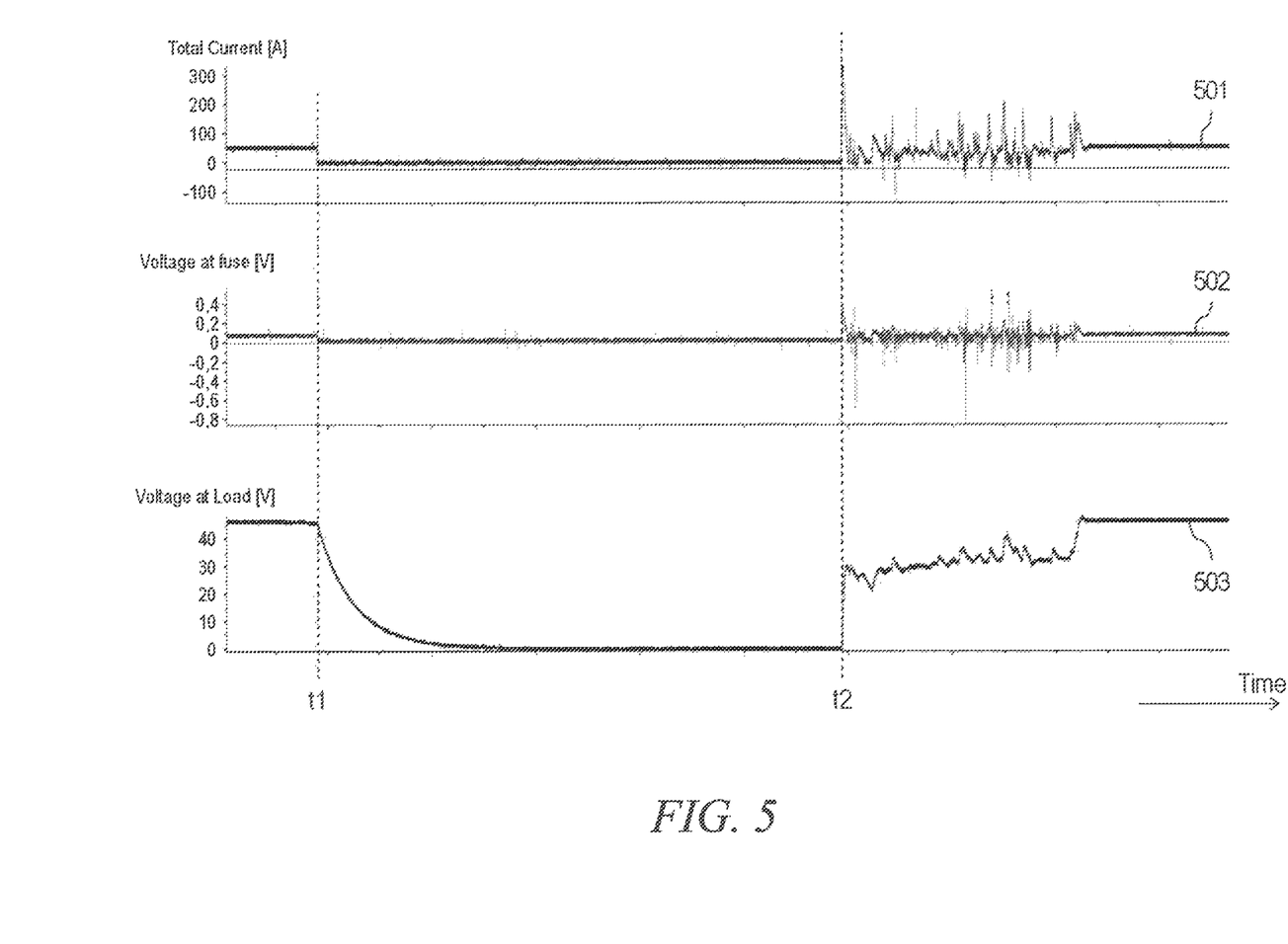
FIG. 5 show a diagram with a plurality of time signal runs: a total current through the load, a voltage at the fuse, and a voltage at the load.

FIG. 5 shows a diagram with several time signal curves. A signal curve 501 shows a total current through the load 105 (and the fuse 104), a signal curve 502 shows a voltage at the fuse 104, and a signal curve 503 shows a voltage at the load 105.

In the example shown in FIG. 5, the supply line 110 is interrupted at a point in time t1. The total current 501 and the voltage at the fuse 104 drop to 0; the voltage at the load 105 gradually drops to 0 because the load 105 is first supplied with the energy stored in the capacity 402. From the point in time t1 to a point in time t2, the intermittent serial electrical arc 401 interrupts the electric circuit. From the point in time t2 on, the connection to the supply line 110 is temporarily restored; because of the previously discharged capacity 402 there will be high current peaks of the total current 501, which are above the total current 501 in steady-state (in the present example, the current peaks are above 100 A and below −100 A, whereas in normal operation, the total current 501 is nearly constant at approximately 50 A). Correspondingly, the signal curve 502 results as voltage drop at the fuse. Said signal curve 502 can be evaluated so that the evaluation unit 109 can detect the serial electrical arc 401 and open the separating element 103.

Figure 6:
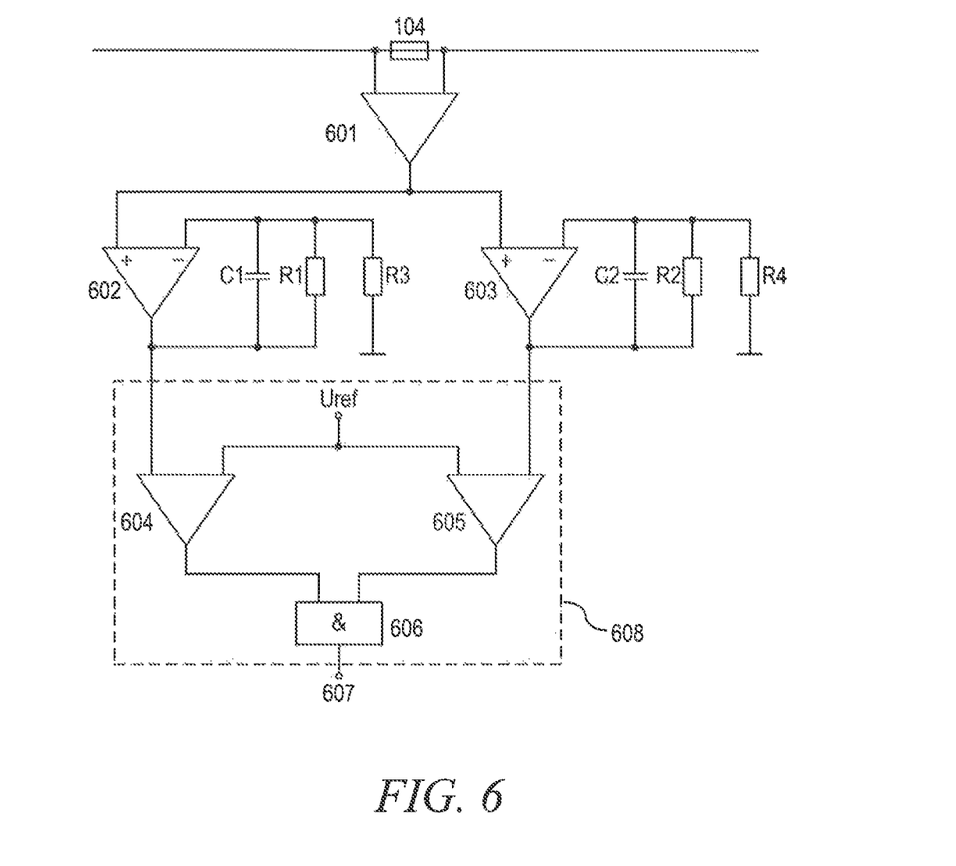
FIG. 6 shows the example of a circuit for the detection unit shown in FIG. 1 or FIG. 4.

FIG. 6 shows an example of a circuit for the detection unit 107. The voltage at the fuse 104 is determined by means of a differential amplifier 601 (which can correspond to the differential amplifier 108 mentioned above).

As explained above, current peaks during a parallel short circuit (caused by the parallel electrical arc 106) lead to a proportional voltage drop at the fuse 104 and/or current peaks result at the fuse 104 due to the charge of the capacity 402 parallel to the load 105 in the case of the serial electrical arc.

The output of the differential amplifier 601 is connected to the non-inverting input of an operational amplifier 602 and to the non-inverting input of an operational amplifier 603. A capacitor C1 is arranged between the inverting input of the operational amplifier 602 and its output, and a resistor R1 is switched in parallel to said capacitor. The inverting input of the operational amplifier 602 is connected to ground via a resistor R3. A capacitor C2 is arranged between the inverting input of the operational amplifier 603 and its output, and a resistor R2 is switched in parallel to said capacitor. The inverting input of the operational amplifier 603 is connected to ground via a resistor R4.

The output of the operational amplifier 602 is connected to the first input of a comparator 604. The output of the operational amplifier 603 is connected to the first input of a comparator 605. The second input of the comparator 604 is connected to the second input of the comparator 605, and is supplied with a reference voltage Uref via a node. The reference voltage Uref corresponds by example to the voltage that displaces the active triggering characteristic in the direction of the curve 304.

The output of the comparator 604 is connected to the first input of an AND gate 606 and the output of the comparator 605 is connected to the second input of the AND gate 606. The output of the AND gate 606 provides a signal 607 that indicates an electrical arc fault and with which the separating element 103 can be opened.

In the present example, according to FIG. 6, the operational amplifiers 602 and 603 with respective wiring represent integrators that determine different time periods for the integration (integration time constants) as a function of the dimensioning of the wiring. The wiring of the operational amplifier 602 determines a time period T1 according to

T1=2πR1C1, and the wiring of the operational amplifier 603 determines a time period T2 according to

T2=2πR2C2.

For example, the circuit can be designed for T1-1 ms and T2-10 ms.

At the output of each operational amplifier 602 and 603, and for the time periods T1 and/or T2, the voltage is proportional to an energy that was taken up by the fuse during that time period. The example lists two time periods T1 and T2. A comparison to the reference voltage Uref is performed for each time period, with the signal 607 opening the separating element 103 only if the energy integrated in both of the two time periods T1 and T2 is already larger than a threshold value determined by a the reference voltage Uref.

As shown in FIG. 6, the logical interconnection 608 of the output signals of the operational amplifiers 602 and 603, resulting in the signal 607, is one of many possible implementations. For example, other logical interconnections (such as different gates, for example) and/or multiple reference voltages may be provided. It is furthermore possible that only one single integrator or more than two integrators are provided.

One advantage of the solution presented here is that it is possible to determine a precise current value per at least one time period, with said time period optionally being designed flexibly. In particular, the at least one time period may be short compared to a time period in which a conventional fuse (such as a melting fuse, for example), would trigger. Another advantage is that multiple time periods can be predetermined and coupled, for example to take a load characteristic of a fault, such as an electrical arc into account as precisely as possible. As a result, a conventional fuse with a predetermined triggering curve can therefore be upgraded with an active triggering characteristic that in particular takes into account time periods during which the energy detected in the fuse is not sufficient for triggering the fuse.

Figure 7:
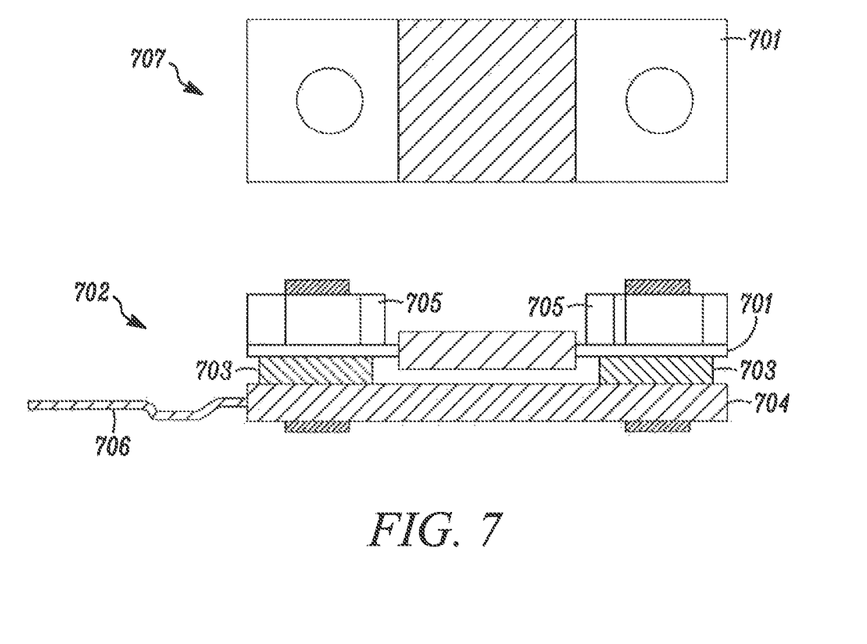
FIG. 7 shows an example of the mechanical integration of an analog filter.

FIG. 7 shows by way of example a mechanical integration of an analog filter 704, such as according to the circuit shown in FIG. 6, for example, for the detection of an electrical arc. FIG. 7 shows a fuse limiter 701 (such as 48V, for example) in a plan view 707 as well as a lateral view 702, with the fuse limiter 701 being connected to the analog filter 704 via spacers 703. Furthermore, FIG. 7 shows screw connections 705.

By means of a connection line 706, a plurality of the fuses with analog filter, as shown in FIG. 7, can be connected in parallel.

Alternately, the analog filter 704 can also be inserted and/or fastened above the fuse limiter 701.

Although the invention was illustrated and described in detail by the at least one embodiment, the invention is not limited to said embodiment and one skilled in the art may derive other variations within the protective scope of the invention.

LIST OF REFERENCE SYMBOLS

101 Battery
102 Ground
103 Separating element (such as an electronic switch or relay, for example)
104 Fuse (such as a melting fuse, for example)
105 Load
106 Parallel electrical arc
107 Detection unit
108 Differential amplifier
109 Evaluation unit
110 Supply line
111 Ground line
301 Curve (limit of the maximum usage range)
302 Curve (load characteristic of the electrical arc)
303 Triggering curve of the fuse 104
304 Active triggering curve
305 Current value
306 Current value
401 Serial electrical arc
402 Capacity (comprising at least one capacitor, for example)
501 Total current through the load 105 (and the fuse 104)
502 Voltage at the fuse 104
503 Voltage at the load 105
601 Differential amplifier
602, 603 Operational amplifier
604, 605 Comparator
606 AND gate
607 Signal (Electrical arc fault)
608 Logical interconnection
R1, . . . , R4 Resistance
C1, C2 Capacitor
701 Fuse limiter
702 Lateral view
703 Spacer
704 Analog filter
705 Screw connection
706 Connecting line
707 Plan view

What is claimed is:

1. A method for interrupting a current of an electrical power supply line, comprising:
integrating a supply line signal of the electrical power supply line over a predetermined time period to obtain an integrated signal, wherein the supply line signal comprises at least one of a current passing through a fuse coupled to the electrical power supply line or a voltage drop across the fuse;
determining whether the integrated signal meets a predetermined condition; and
using a current interrupting element to interrupt the current if the integrated signal meets the predetermined condition.

2. The method according to claim 1, wherein determining whether the integrated signal meets the predetermined condition includes determining whether the integrated signal meets a predetermined threshold value.

3. The method according to claim 1, wherein integrating the supply line signal includes averaging the supply line signal over the predetermined time period.

4. The method according to claim 3, wherein averaging the supply line signal includes performing a squared averaging on the supply line signal over the predetermined time period.

5. The method according to claim 1, wherein integrating the supply line signal includes:
measuring a voltage drop across a fuse coupled to the electrical power supply line,
determining a resistance value of the fuse according to a temperature associated with the fuse, and
determining a current passing through the fuse according to the resistance value and the voltage drop.

6. The method according to claim 1, wherein integrating the supply line signal includes:
integrating the supply line signal using a first integrator, having a first integration time constant, to obtain a first integrated signal, and
integrating the supply line signal using a second integrator, having a second integration time constant, to obtain a second integrated signal.

7. The method according to claim 6, wherein determining whether the integrated signal meets the predetermined condition includes:
performing a logical operation based on the first and second integrated signals, and
determining whether a result of the logical operation meets the predetermined condition.

8. An interrupting device, comprising:
a signal-interrupt element coupled to an electrical power supply line;
a detection unit coupled to the signal-interrupt element and to the electrical power supply line; and
a fuse coupled to the detection unit and to the electrical power supply line,
wherein the detection unit is configured to:
integrate a supply line signal of the electrical power supply line over a predetermined time period to obtain an integrated signal, wherein the supply line signal comprises a current passing through the fuse or a voltage drop across the fuse,
determine whether the integrated signal meets a predetermined condition, and
trigger, if the integrated signal meets the predetermined condition, the signal-interrupt element to interrupt a current of the electrical power supply line.

9. The device according to claim 8, wherein the detection unit includes:
a differential amplifier having inputs coupled to terminals of the fuse; and
an evaluation unit coupled to the differential amplifier and to the signal-interrupt element, wherein the evaluation unit is configured to:
determine, based on an output of the differential amplifier, whether the voltage drop across the fuse meets the predetermined condition, and
trigger, if the voltage drop across the fuse meets the predetermined condition, the signal-interrupt element.

10. The device according to claim 8, wherein the signal-interrupt element is an electronically-controlled switch.

11. A method for interrupting a current of an electrical power supply line, comprising:
integrating a supply line signal of the electrical power supply line over a predetermined time period to obtain an integrated signal, wherein integrating the supply line signal comprises:
measuring a voltage drop across a fuse coupled to the electrical power supply line,
determining a resistance value of the fuse according to a temperature associated with the fuse, and
determining a current passing through the fuse according to the resistance value and the voltage drop;
determining whether the integrated signal meets a predetermined condition; and
using a current interrupting element to interrupt the current if the integrated signal meets the predetermined condition.

* * * * *